US 8,345,379 B2

(12) United States Patent
Maeda et al.

(10) Patent No.: US 8,345,379 B2
(45) Date of Patent: Jan. 1, 2013

(54) DISK DRIVE DEVICE EQUIPPED WITH A BEARING UNIT RELATIVELY ROTATABLY SUPPORTING A HUB AGAINST BASE MEMBER

(75) Inventors: Toshiki Maeda, Shizuoka (JP);
Kazuhide Kamata, Shizuoka (JP);
Morifumi Ohsawa, Shizuoka (JP)

(73) Assignee: Alphana Technology Co., Ltd., Shizuoka (JP)

( * ) Notice: Subject to any disclaimer, the term of this patent is extended or adjusted under 35 U.S.C. 154(b) by 196 days.

(21) Appl. No.: 12/873,186

(22) Filed: Aug. 31, 2010

(65) Prior Publication Data
US 2011/0116191 A1    May 19, 2011

(30) Foreign Application Priority Data
Nov. 18, 2009  (JP) .............................. 2009-262580
Dec. 10, 2009  (WO) ................. PCT/JP2009/006749

(51) Int. Cl.
*G11B 17/02*  (2006.01)
(52) U.S. Cl. ................... 360/99.08; 360/99.12
(58) Field of Classification Search .................. 720/695, 720/703; 360/99.12, 99.08, 98.07, 99.04
See application file for complete search history.

(56) References Cited

U.S. PATENT DOCUMENTS

| 5,047,677 | A | * | 9/1991 | Mineta et al. ............... 310/67 R |
| 5,452,156 | A | * | 9/1995 | Uda et al. .................... 360/99.19 |
| 5,872,682 | A | * | 2/1999 | Saichi et al. ............... 360/99.12 |
| 5,877,918 | A | * | 3/1999 | Katakura et al. ........... 360/99.08 |
| 6,205,110 | B1 | * | 3/2001 | Miyamoto et al. ............. 369/266 |
| 6,316,855 | B1 | * | 11/2001 | Moosmann et al. ............. 310/71 |
| RE38,772 | E | * | 8/2005 | Elsasser et al. ............. 360/98.07 |
| 8,120,873 | B2 | * | 2/2012 | Uchibori et al. ........... 360/99.08 |
| 8,164,850 | B2 | * | 4/2012 | Gomyo et al. ............. 360/98.07 |
| 2008/0024024 | A1 | * | 1/2008 | Tamaoka ........................ 310/90 |
| 2010/0202084 | A1 | * | 8/2010 | Watanabe et al. .......... 360/99.08 |
| 2011/0116191 | A1 | * | 5/2011 | Maeda et al. ................. 360/224 |

FOREIGN PATENT DOCUMENTS

| JP | 11-308836 A1 | 11/1999 |
| JP | 11-332202 A | 11/1999 |
| JP | 2007-073164 A | 3/2007 |
| JP | 2007-244146 A | 9/2007 |
| JP | 2007198555 | 9/2007 |

OTHER PUBLICATIONS

Partial English Machine Translation for JP 11-308836 (Tadayuki), May 11, 1999, 8 pages.*
International Report on Patentability, Jul. 10, 2012, 7 pages.

* cited by examiner

*Primary Examiner* — Brian Miller
(74) *Attorney, Agent, or Firm* — Fulwider Patton LLP

(57) ABSTRACT

A disk drive device has a hub so configured as to place and hold recording disks. Where the non-rotating eigenfrequency of resonance in a secondary rocking mode with the recording disks placed on the hub is defined to be F0 (Hz) and the rotational frequency of the hub is defined to be N (Hz), an extending part of the hub and a second cylinder part of the hub are formed such that the radial dimension of the extending part is smaller than the axial dimension of the second external cylinder part to satisfy to a relation $F0 > N \cdot (3 \cdot P + 2)$.

20 Claims, 2 Drawing Sheets

DISK DRIVE DEVICE EQUIPPED WITH A BEARING UNIT RELATIVELY ROTATABLY SUPPORTING A HUB AGAINST BASE MEMBER

CROSS-REFERENCE TO RELATED APPLICATION

This application is based upon and claims the benefit of priority from the prior PCT International Patent Application No. PCT/JP2009/006749, filed on Dec. 10, 2009, and Japanese Patent Application No. 2009-262580, filed on Nov. 18, 2009, the entire content of which is incorporated herein by reference.

BACKGROUND OF THE INVENTION

1. Field of the Invention

The present invention relates to a disk drive device for rotating and driving a recording disk.

2. Description of the Related Art

A hard disk drive is widely available as a storage medium used for a storage device or like of a computer. The rotation precision of the hard disk drive has markedly improved and, accordingly, there is a growing demand for higher density and larger capacity in the hard disk drive. For example, such a highly advanced hard disk drive is disclosed in Japanese Patent Application Publication No. 2007-198555 featuring a motor equipped with a fluid dynamic bearing.

In a hard disk drive, a disk with recording tracks formed thereon is rotated by a brushless motor at high speed. To read/write the magnetic data contained in the recording tracks, a read/write head is arranged over a recording disk with a very small clearance between the read/write head and the surface of the recording disk.

As a way of promoting the higher capacity of the hard disk drive, a method is available where the width of the recording tracks is reduced and the position of the read/write head relative to the surface of the recording disk is further reduced. However, this arrangement has the following drawbacks. That is, a vibration due to the torque ripple of the brushless motor and the resonance in a secondary rocking mode may become larger. And the reduction in the width of the recording tracks may cause a vibration, which in turn vibrates the read/write head. Thus the trace of the recording track may be disturbed.

Also, further reduction of the clearance between the record/write head and the recording disk results in a large variation in the clearance even with a small amount of vibration in the read/write head. Thus, whenever the trace of the recording track is disturbed and the amplitude of an output signal of the read/write head varies, the frequency at which the malfunction occurs, at the time the data in the hard disk drive is read and written, may increase.

SUMMARY OF THE INVENTION

The present invention has been made in view of the foregoing circumstances, and a purpose thereof is to provide a disk drive that reduces the vibration occurring during the drive thereof.

To resolve the foregoing problems, a disk drive device according to one embodiment of the present invention comprises: a base member; a hub configured such that a recording disk is placed thereon; a bearing unit configured to relatively rotatably support the hub against the base member; a core, fixed to the base member, configured to contain a circular part and a plurality of salient poles radially extending from the circular part; a three-phase coil formed in such a manner as to wind around the plurality of salient poles; a yoke fixed to the hub; and a magnet fixed onto an inner circumference of the yoke and radially facing the plurality of salient poles, the magnet being magnetized to drive P poles (P being an even number greater than or equal to 2) circumferentially. The hub includes: a first external cylinder part extending axially, the first external cylinder part being fit to a central hole of the recording disk; a seating surface on which the recording disk is placed, the seating surface connecting to the first external cylinder part and extending in a radially outward direction; a second external cylinder part connecting to the seating surface and extending axially; and an extending part connecting to the second external cylinder part and extending in a radially outward direction. When a non-rotating eigenfrequency of resonance in a secondary rocking mode with the recording disk placed on the hub is defined to be F0 (Hz) and a rotational frequency of the hub is defined to be N (Hz), the disk drive device is configured so that the eigenfrequency F0 satisfies a relation $F0 > N \cdot (3 \cdot P + 2)$ and a radial dimension of the extending part is smaller than an axial dimension of the second external cylinder part.

By employing the disk drive device according to this embodiment, the vibration caused by the agreement between the torque ripple frequency and the eigenfrequency of resonance in a secondary rocking mode can be reduced.

Another embodiment of the present invention relates also to a disk drive device. The disk drive device comprises: a base member; a hub configured such that a recording disk is placed thereon; a bearing unit configured to relatively rotatably support the hub against the base member; a core, fixed to the base member, configured to contain a circular part and a plurality of salient poles radially extending from the circular part; a three-phase coil formed in such a manner as to wind around the plurality of salient poles; a yoke fixed to the hub; and a magnet fixed onto an inner circumference of the yoke and radially facing the plurality of salient poles, the magnet being magnetized to drive P poles (P being an even number greater than or equal to 2) circumferentially. When a non-rotating eigenfrequency of resonance in a secondary rocking mode with the recording disk placed on the hub is defined to be F0 (Hz) and a rotational frequency of the hub is defined to be N (Hz) and a rotational frequency greater than N is defined to be M (Hz), the disk drive device is configured so that the eigenfrequency F0 satisfies a relation $N \cdot (3 \cdot P + 2) < F0 < M \cdot (3 \cdot P - 2)$.

By employing the disk drive device according to this embodiment, even if the disk drive device is used for different rotational frequencies, the vibration caused by the agreement between the torque ripple frequency and the eigenfrequency of resonance in a secondary rocking mode can be reduced.

Optional combinations of the aforementioned constituting elements, and implementations of the invention in the form of methods, apparatuses, systems, recording media, computer programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
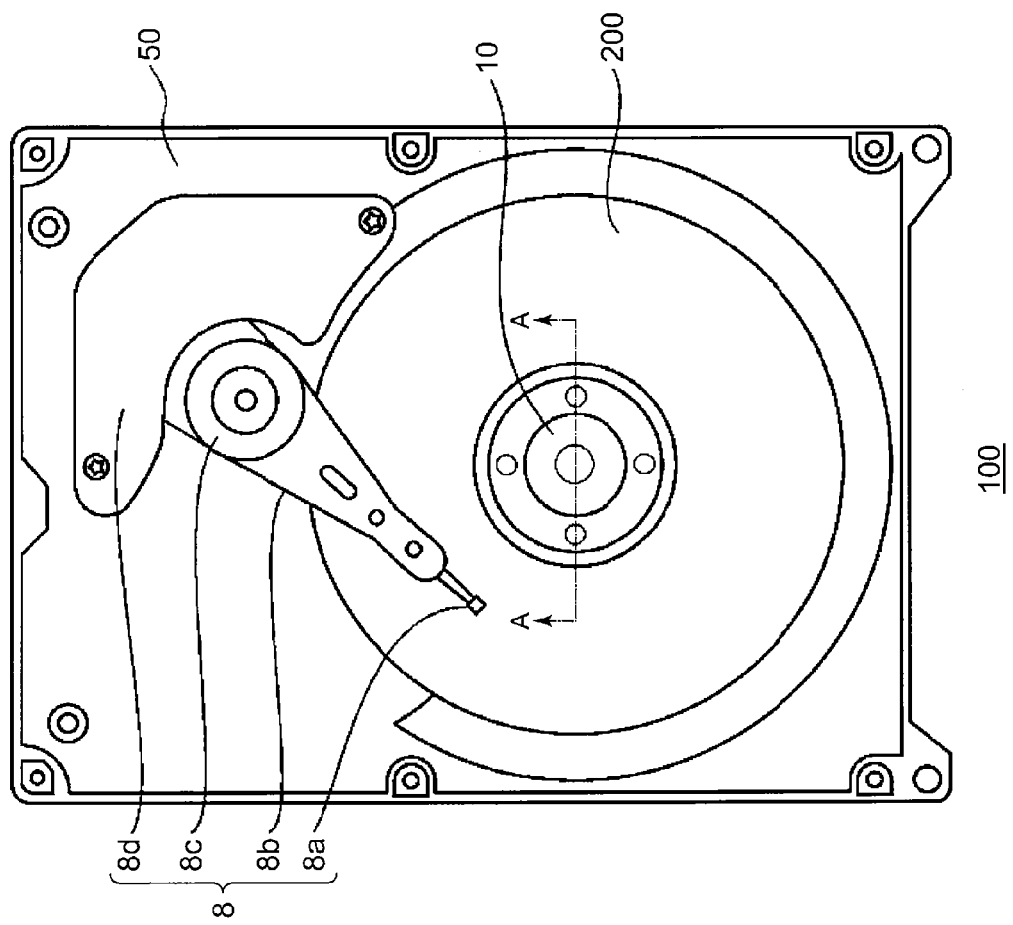
FIG. 1 is a top view showing a disk drive device according to an embodiment of the present invention.

Hereinafter, the present invention will be described based on preferred embodiments with reference to the accompanying drawings. The preferred embodiments do not intend to limit the scope of the invention but exemplify the invention. The same or equivalent constituents or members illustrated in each drawing will be denoted with the same reference numerals, and the repeated description thereof will be omitted as appropriate. The size of the component in each figure may be changed as appropriate in order to aid understanding. Some of the components and members in each figure may be omitted if they are not important in the course of explanation. All of the features and the combinations thereof described in the embodiments are not necessarily essential to the invention.

A disk drive device according to an embodiment is preferably used for a hard disk drive, provided with a recording disk, which rotates and drives the recording disk. The disk drive device may be a device used to drive the recording disk and the like and may be a brushless motor, for instance.

FIG. 1 is a top view showing a disk drive device 100 according to an embodiment of the present invention. To show an internal structure of the disk drive device 100, a top cover (not shown) is removed in FIG. 1. The disk drive device 100 is comprised of a base member 50, a recording disk 200, a hub 10 on which the recording disk 200 is placed and held, a data read/write unit 8, and a top cover.

The recording disk 200 is mounted on the hub 10 and rotates together with the hub 10. The base member 50 is formed such that an aluminum alloy is molded using a die-cast. The base member 50 rotatably supports the hub 10 via a bearing.

The data read/write unit 8 includes a read/write head 8a, a swing arm 8b, a pivot assembly 8c, a voice coil motor 8d. The read/write head 8a, mounted on an end of the swing arm 8b, moves close to the top surface or bottom surface of the recording disk 200 so as to write data to and read data from the recording disk 200. Utilizing the both surfaces of the recording disk 200, the recording capacity of the recording disk 200 can be increased.

The pivot assembly 8c, which rotates about the center thereof as a rotation axis, swingably supports the swing arm 8b relative to the base member 50. The voice coil motor 8d, which functions as an actuator (driving member) of the data read/write unit 8, causes the swing arm 8b to swing and thereby moves the read/write head 8a to a predetermined position on the recording surface of the recording disk 200. The data read/write unit 8 may be configured by the use of any technique for controlling the position of the head.

Figure 2:
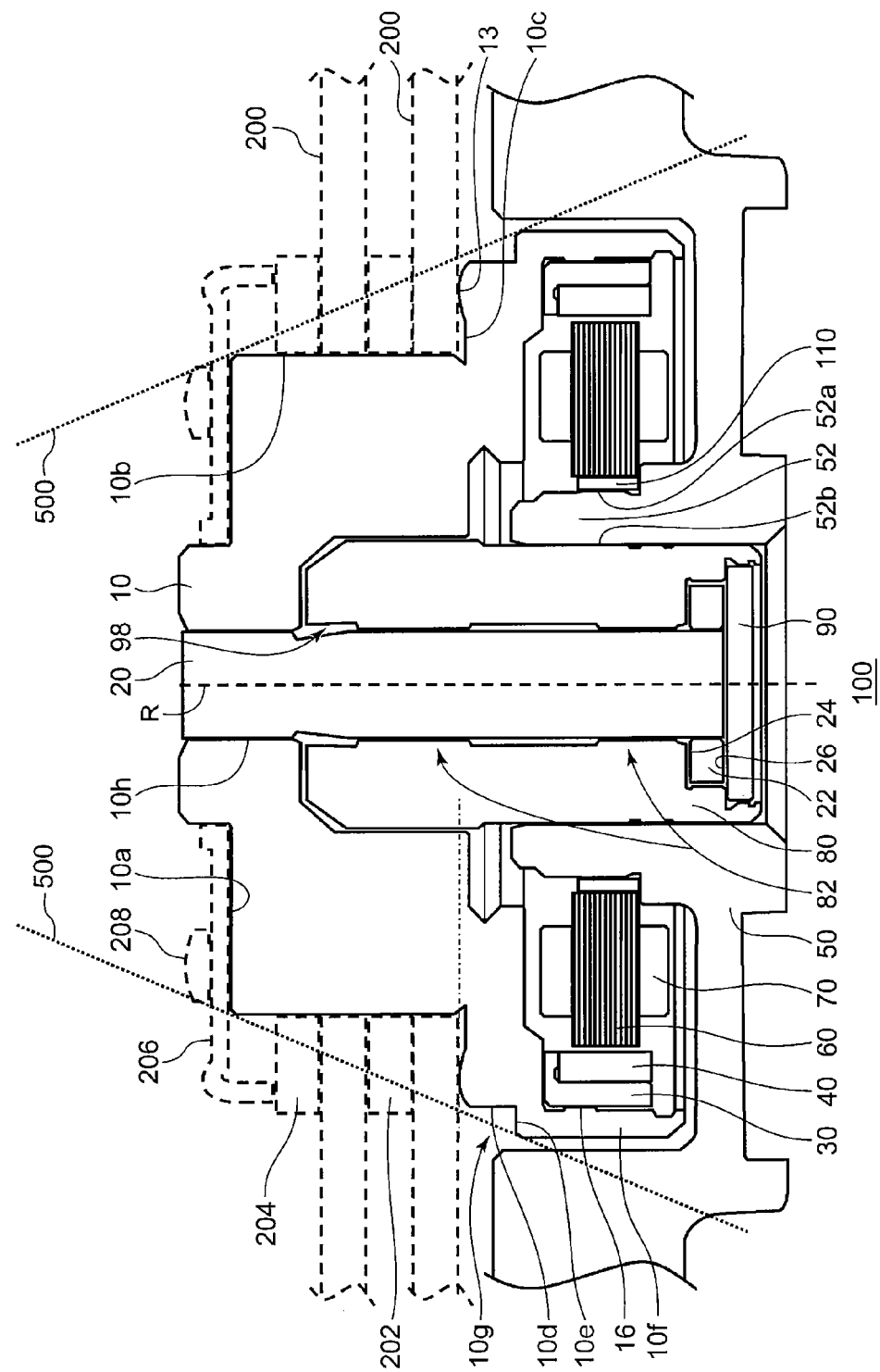
FIG. 2 is a cross-sectional view of a disk drive device according to an embodiment of the present invention.

FIG. 2 is a cross-sectional view of the disk drive device 100 according to the embodiment of the present invention. FIG. 2 is a cross-sectional view of the disk drive device 100 taken along the line A-A of FIG. 1. The disk drive device 100 mounts two recording disks 200 of 3.5 inch type (95 mm in diameter), and rotates the two recording disks 200. The diameter and the thickness of a central hole of each of the two recording disks 200 assumed herein are 25 mm and 1.50 mm, respectively.

The disk drive device 100 is further comprised of a shaft 20, a flange 22, a yoke 30, a magnet 40, a laminated core 60, a coil 70, a sleeve 80, a plate 90, a lubricant agent, and a damping ring 110.

The hub 10 is formed in a circle with a motor rotating shaft R as the center, and the outer shape thereof is formed in a projected manner. The inner shape of the hub 10 is formed in such a manner as to surround the bearing. The hub 10 has a first external cylinder part 10b extending along the axial direction of the bearing unit to hold the recording disk 200 and a seating surface 10c connecting to the first external cylinder part 10b and extending in a radially outward direction to seat the recording disk 200. The central holes of the two recording disks 200 are fit into the first external cylinder part 10b. The diameter of the first external cylinder part 10b is 25 mm. More precisely, the diameter of the first external cylinder part 10b is within 24.978±0.01 mm.

A raised part 13 protruded upward is formed on the seating surface 10c so that a lower-side recording disk of the two recording disks 200 can be seated thereon. The raised part 13 is formed in a ring shape around the motor rotating shaft R, and a surface, of a partial region of the raised part 13, on which the recording disk is seated is a smoothly-curved surface (rounded surface). The cross section of the rounded surface is of a circular shape, and the recording disk 200 is in contact with the seating surface 10 in line.

A ring-shaped spacer 202 is provided between the two recording disks 200. A clamper 206 fixes the two recording disks 200 by pressing the two recording disks 200 against the hub 10 via a ring-shaped second spacer 204 and the first spacer 202. The clamper 206 is fixed to a top face 10a of the hub 10 by a plurality of clamp screws 208.

In the hub 10, a ring-shaped recess 10g, which is dented circularly, is formed radially inward around the periphery of the seating surface 10c. The recess 10g is provided to ensure the movable range of the read/write head 8a within which the read/write head 8a is allowed to move freely without interference or obstacles. Note that the movable range of the read/write head 8a is a space within which the read/write head 8a operates to read and/or write the data to and/or from the recording disks 200. The ring-shaped recess 10g has a second external cylinder part 10d connecting to the seating surface 10c and extending along the axial direction, and an extending part 10e connecting to the second external cylinder part 10d and extending in a radially outward direction. Further, the hub 10 has a circular wall 10f connecting to the extending part 10e and extending along the axial direction.

The yoke 30 is formed of a magnetic material, such as iron, and the cross section thereof is an inverted L-shape. The yoke 30 is fixed onto an inner circumferential surface of the circular wall 10f by simultaneously bonding and press-fitting the yoke 30 thereonto. A protrusion 16 against which the yoke 30 is pressed, when the yoke 30 is to be press-fit, is formed on the inner circumferential surface of the circular wall 10f. The protrusion 16 is formed circularly and is arranged with the motor rotating shaft R as the axis thereof. A space between the inner circumferential surface of the circular wall 10f and an outer circumferential surface of the yoke 30 is filled with an adhesive. This is achieved by applying beforehand an appropriate quantity of the adhesive to the inner circumferential surface of the circular wall 10f when the yoke 30 is press-fit onto the hub 10.

The magnet 40 is bonded and fixed onto the inner circumferential surface of the yoke 30. That is, the magnet 40 is fixed to the hub 10 with the yoke 30 held between the magnet 40 and the hub 10. The magnet 40 is formed of a rare-earth material such as neodymium, iron or boron, and radially faces the salient poles of the laminated core 60. The magnet 40 is magnetized to drive P poles where P is an even number greater than or equal to 2.

The hub 10 is formed of an aluminum alloy, for instance, and the shaft 20 is formed of a stainless-steel material of SUS 420J2. If the hub 10 and the shaft 20 are formed of such materials as those described above, the coefficient of linear expansion of the hub 10 will be larger than that of the shaft 20. One end of the shaft 20 is firmly fixed through an opening 10*h* provided in the center of the hub 10 by interference fitting. The other end of the shaft 20 is firmly fixed to the flange 22 by interference fitting. Note that an adhesive may be used together with the interference fitting.

In a central region of the base member 50, there is provided a projected portion 52 with the motor rotating shaft R as the central axis. An outer circumferential surface 52*a* of the projected portion 52 is a cylindrical side surface. An inner circumferential surface 52*b* of the projected portion 52 forms a through-hole, and the sleeve 80 is bonded and fixed onto the inner circumferential surface 52 thereof. The shaft 20 is inserted into the sleeve 80. The plate 90 is bonded and fixed onto an open end of the sleeve 80 on a flange 22 side.

The lubricant agent is injected into a gap formed between the shaft 20 and the flange 22 and a gap formed between the sleeve 80 and the plate 90. The shaft 20, the flange 22, the lubricant agent, the sleeve 80 and the plate 90 constitute the bearing with which to rotatably support the hub 10.

A pair of herringbone-shaped radial dynamic pressure grooves 82, which are slightly apart from each other in the vertical direction, is formed in the inner circumferential surface 80. A herringbone-shaped first thrust dynamic pressure groove 24 is formed on the upper surface of the flange 22, whereas a herringbone-shaped second thrust dynamic pressure groove 26 is formed on the lower surface thereof. While the disk drive device 100 is driven, the hub 10 and the shaft 20 are supported radially and axially by the dynamic pressures generated by the lubricants in the dynamic pressure grooves.

A capillary seal 98 is formed on an open-end side of the sleeve 80. The capillary seal 98 is an area where the size of a gap between the inner circumferential surface of the sleeve 80 and an outer circumferential surface of the shaft 20 gradually increases in a direction from a lower side of the gap toward an upper side thereof. The capillary seal 98 utilizing the capillary phenomenon prevents the lubricant agent from being leaked.

The laminated core 90 has a circular part and nine salient poles extending from the circular part in a radially outward direction. The laminated core 60 is formed such that eight non-oriented electromagnetic steel sheets each having the thickness of 0.35 mm are stacked together and integrally formed into a single unit by caulking In a method for manufacturing the laminated core 60, an electromagnetic steel sheet which has been subjected to the insulation processing on the surface is first press-formed and stamped out in a desired shape by half-punching the sheets. Then the press-formed eight electromagnetic steel sheets are integrally formed into the single unit in such a manner that the press-formed eight electromagnetic steel sheets are swaged by an internal die caulking that uses a half punching process. After formed integrally, the laminated core 60 undergoes the surface processing. Various methods may be used for this surface processing. For example, a method for adhering an epoxy resin using the spray coating or cationic electrodeposition may be advantageous in that a uniformly coated film can be formed.

The coil 70 is wound around each of the salient poles of the laminated core 60. A three-phase drive current of an approximately sinusoidal waveform flows through the coil 70 so as to generate a drive magnetic flux along the salient pole.

The damping ring 110 is made of a material softer than the electromagnetic steel sheet of the laminated core 60. For example, the damping ring 110 is a cylindrical member formed of aluminum which is lightweight and easily processed. The damping ring 110 is press-fit into a space between the circular part of the laminated core 60 and the projected portion 52 so as to suppress the vibration of the laminated core 60.

An operation of the disk drive device 100 configured as above will now be described. The three-phase drive current is supplied to the coil 70 to rotate the recording disk 200. With the drive current supplied, the coil 70 forms the drive magnetic flux along each of the salient poles. The drive magnetic flux gives the torque on the magnet 40 so as to rotate a rotor such as the hub 10 and the shaft 20.

A description is given hereunder of the torque ripple and the resonance in the disk drive device 100 according to the present embodiment. Assume herein that two recording disks 100 are placed and held on top of the disk drive device 100.

The torque ripple is first considered. In the disk drive device 100, a drive torque is produced by the interaction between the magnetic flux formed by the coil 70 and the magnetic poles of the magnet 40. The torque ripple is a pulsating component contained in the drive torque. The frequency of a fundamental wave of the torque ripple (hereinafter referred to as "torque-ripple center frequency") is proportional to the rotational frequency (the number of revolutions) N (Hz), per second, of the disk drive device 100 and the number of magnetic poles of the magnet 40. The torque-ripple center frequency is theoretically expressed by the following Formula (1).

$$3 \cdot P \cdot N \text{(Hz)} \qquad \text{Formula (1)}$$

In the actual setting, there is nonuniformity in interaction. That is, the drive torque on the rotor is nonuniform throughout each rotation of the rotor. Thus the torque ripple is modulated by a frequency which equals the rotational frequency N (Hz). As a result, the torque ripple contains sideband components of the frequency as indicated in the following Formula (2).

$$3 \cdot P \cdot N \pm N = (3 \cdot P \pm 1) \cdot N \text{(Hz)} \qquad \text{Formula (2)}$$

In what is to follow, the torque ripple contains the torque-ripple center frequency $3 \cdot P \cdot N$ and two sideband components $(3 \cdot P \pm 1) \cdot N$. If no particular distinction is made among these three frequencies, they will be called a torque ripple frequency.

Next, the resonance is considered. In the disk drive device 100 with the recording disks 200 mounted thereon, the resonance in the secondary rocking mode may occur in the recording disks 200. The eigenfrequency of resonance in the secondary rocking mode while the disk drive device 100 is not rotating is defined to be F0 (hereinafter referred to as "eigenfrequency F0").

The inventor of the present invention has verified a split phenomenon. That is, as the recording disks 200 rotate, the eigenfrequency F0 of resonance in the second rocking mode splits in the rotational direction and the counter-rotational direction, together with the increase in the rotational frequency N (Hz), due to the gyro effect. More specifically, if the recording disks rotate with a rotational frequency N (Hz), the split amount will be ±N and the two split frequencies Fs of resonance in the second rocking mode are F0±N (Hz). Thus, the inventor of the present invention puts forward a novel idea about these two split frequencies Fs when the resonance in the second rocking mode is used.

If any one of the above-described three torque ripple frequencies and any one of the two split frequencies of resonance in the secondary rocking mode agrees with each other, this will cause the recording disks 200 to vibrate a great deal. This vibration causes a disturbance in the trace of the recording tracks, which in turn may worsen the frequency at which the malfunction occurs at the time the data is read and written.

Hence, the vibration may pose a hindrance to the higher density and larger capacity of hard disks and the like used in the disk drive device 100.

The inventor of the present invention had found out that the structure realized by the present embodiment has a significant effect and operation as follows. That is, where the rotational frequency N (Hz) of the disk drive device 100 is preset, realized is a disk drive device 100 whose eigenfrequency F0 of resonance in the secondary rocking mode satisfies the following Formula (3).

$$F0 > (3 \cdot P + 2) \cdot N \text{(Hz)} \quad \text{Formula (3)}$$

Under a condition where Formula (3) holds true, the lower frequency of the two split frequencies can be set higher than the highest torque ripple frequency. Thus, that the torque ripple frequency and the split frequency agree with each other can be prevented, so that vibration occurring in the disk drive device 100 can be reduced.

Note that Formula (3) may not be satisfied due to a temperature change, deterioration over a long period of time, variation in the precision of components and parts involved, variation in manufacturing processes, and the like. To cope with this problem, the following Formula (4) where some margins are taken into consideration to guarantee the robustness may be used instead of Formula (4) as necessary.

Thereby, the vibration occurring in the disk drive device 100 can still be reduced even when some disturbances and variations such as a temperature change are present.

To determine conditions for the disk drive device 100 to meet Formula 3, the inventor of the present invention conducted experiments as follows. First, the disk drive device 100 mounts two recording disks 200 of 3.5 inch type (95 mm in diameter). The diameter and the thickness of the central hole of each of the two recording disks 200 are 25 mm and 1.50 mm, respectively. The magnet 40 is magnetized to drive P poles (P=8 here) circumferentially. The rotational frequency of the disk drive device 100 is set to N=90 (Hz) (equivalent to 5400 r/m). Under these conditions, the eigenfrequency F0 satisfying Formula 3 is 2340 (Hz) or higher.

In the following experiments, the eigenfrequency F0 is verified. Note that the unit of length shown hereunder is millimeter (mm).

[1] First Experiment
Axial dimension Ld of the external cylinder part 10*d*=1.65
Diameter D1 of the first external cylinder part=25.0
Diameter D2 of the second external cylinder part=30.2
Diameter D3 of the circular wall=33.9
Radial dimension Le of the extending part 10*e*=(33.9-30.2)/2=1.85

According to the first experiment as described above, the eigenfrequency F0 of 2330 Hz is obtained when the radial dimension Le of the extending part 10*e* is made longer than the axial dimension Ld of the second external cylinder part 10*d*.

[2] Second Experiment
Axial dimension Ld of the external cylinder part 10*d*=1.65
Diameter D1 of the first external cylinder part=25.0
Diameter D2 of the second external cylinder part=30.6
Diameter D3 of the circular wall=33.9
Radial dimension Le of the extending part 10*e*=(33.9-30.6)/2=1.65

According to the second experiment as described above, the eigenfrequency F0 of 2340 Hz is obtained when the radial dimension Le of the extending part 10*e* and the axial dimension Ld of the second external cylinder part 10*d* are made equal to each other.

[3] Third Experiment
Axial dimension Ld of the external cylinder part 10*d*=1.65
Diameter D1 of the first external cylinder part=25.0
Diameter D2 of the second external cylinder part=31.9
Diameter D3 of the circular wall=33.9
Radial dimension Le of the extending part 10*e*=(33.9-31.9)/2=1.00

According to the third experiment as described above, the eigenfrequency F0 of 2380 Hz is obtained when the radial dimension Le of the extending part 10*e* is made shorter than the axial dimension Ld of the second external cylinder part 10*d*.

[4] Fourth Experiment
Axial dimension Ld of the external cylinder part 10*d*=1.65
Diameter D1 of the first external cylinder part=25.0
Diameter D2 of the second external cylinder part=32.6
Diameter D3 of the circular wall=33.9
Radial dimension Le of the extending part 10*e*=(33.9-32.6)/2=0.65

According to the fourth experiment as described above, the eigenfrequency F0 of 2400 Hz is obtained when the radial dimension Le of the extending part 10*e* is made further shorter, as compared with the third experiment, than the axial dimension Ld of the second external cylinder part 10*d*.

[5] Fifth Experiment
Axial dimension Ld of the external cylinder part 10*d*=1.65
Diameter D1 of the first external cylinder part=25.0
Diameter D2 of the second external cylinder part=33.2
Diameter D3 of the circular wall=33.9
Radial dimension Le of the extending part 10*e*=(33.9-33.2)/2=0.35

According to the fifth experiment as described above, the eigenfrequency F0 of 2420 Hz is obtained when the radial dimension Le of the extending part 10*e* is made still further shorter, as compared with the fourth experiment, than the axial dimension Ld of the second external cylinder part 10*d*.

Let us go over the above-described first to fifth experiments. Knowledge is gained based on these experiments. For example, the eigenfrequency F0 tends to become shorter as the radial dimension of the extending part 10*e* is made longer, whereas the eigenfrequency F0 tends to become higher as the radial dimension of the extending part 10*e* is made shorter. Here, Formula 3 is met if the eigenfrequency F0 is larger than 2340 (Hz).

When Le>Ld as in the first experiment, the eigenfrequency F0 is 2330 (Hz), which means that F0 does not satisfy Formula 3. When Le=Ld as in the second experiment, the eigenfrequency F0 is 2340 (Hz), which means that F0 does not satisfy Formula 3. When Le<Ld with Le=1.00 as in the third experiment, the eigenfrequency F0 is 2380 (Hz), which means that F0 satisfies Formula 3. When Le<Ld with Le=0.65 as in the fourth experiment, the eigenfrequency F0 is 2400 (Hz), which means that F0 satisfies Formula 3. When Le<Ld with Le=0.35 as in the fifth experiment, the eigenfrequency F0 is 2420 (Hz), which means that F0 satisfies Formula 3. Thus, it is found that if the radial dimension of the extending part 10*e* of the hub 10 is so formed as to be shorter than the axial dimension of the second external cylinder part 10*d*, the disk drive device 100 capable of satisfying Formula 3 will be achieved.

If the radial dimension Le is made smaller while the sizes of the yoke 30, the magnet 40 and other components remain unchanged, the diameter D2 of the second external cylinder part 10*d* will be larger. When the diameter D2 of the second cylinder part 10*d* becomes larger, the movable range of the read/write head 8*a* gets restricted. Thus a problem arises where data cannot be properly read from and written to an area close to the central holes of the recording disks 200.

Thus, if the radial dimension of the extending part 10e is made smaller than the axial dimension of the second external cylinder part 10d by increasing the diameter of the second cylinder part 10d, the second external cylinder part 10d will be so configured as to ensure the movable range of the read/write head 8a in the axial direction. For example, the diameter D2 of the second cylinder part 10d is so configured and determined that a space or gap is formed relative to the outermost circumference of the movable range of the read/write head 8a. Through the experiences as one skilled in the art, it is known to the inventor of the present invention that such a space and gap contains dimension errors and installation errors of the members. Accordingly, the diameter D2 of the second external cylinder part may be of a dimension that allows the space, which is greater than or equal to 1 mm, relative to the predetermined movable range of the read/write head 8a. In other words, the distance between the motor rotating shaft R and the pivot assembly 8c is so configured and determined as to be longer, by 0.1 mm or more, than the sum of the diameter D2 of the second external cylinder part 10d and the length of the rotating shaft to the end of the read/write head 8a. This can prevent the read/write head 8a from becoming in contact with the second external cylinder part 10d even though individual differences should occur in a manufacturing process. From the viewpoint of miniaturization in the disk drive device 100, it is desired that the distance between the motor rotating shaft R and the pivot assembly 8c be as small as possible.

Based on the above studied results, particularly the third experiment, it is found that when the diameter D2 of the second external cylinder part 10d is so formed as to be larger than 31.9 mm, the eigenfrequency F0 satisfies Formula 3 and therefore the vibration occurring in the disk drive device 100 can be reduced. Also, the present embodiment has the following advantageous effect. That is, when the diameter of the outermost circumference of the movable range of the read/write head 8a is 33.1 mm, the size of the disk drive device 100 is made smaller and the outermost circumference of the movable range of the read/write head 8a is ensured if the diameter D2 of the second external cylinder part 10d is 33 mm or below.

If the recording disks 200 are magnetic recording media, a leakage magnetic flux generated from the magnetic poles of the magnet 40 may act on the read/write head 8a and accumulate on the output signal of the read/write head 8a as a noise signal and therefore it is possible to increase the frequency at which the malfunction occurs at the time the data is read and written. Thus, in order not to overlap axially with a part of the seating surface 10c in contact with the recording disks 200, the magnet 40 is provided radially inward of a part of the seating surface 10c in contact with the recording disks 200.

If the read/write head 8a gets too close axially to the magnet 40, it is possible that the leakage magnetic flux acts on the recording read/write head 8a and accumulates on the output signal of the read/write head 8a as a noise signal, thereby increasing the frequency at which the malfunction occurs at the time the data is read and written. Thus, in order that the movable range of the read/write head 8a should not overlap axially with the magnet 40, the second external cylinder part 10d is provided in a position axially closer to the outer circumferential surface of the yoke 30 than the outer circumferential surface of the magnet 40.

Since increasing the diameter D2 of the second external cylinder part 10d restricts the movable range of the read/write head 8a, the diameter D2 of the second external cylinder part 10d may be the same size as the diameter of the outer circumferential surface of the yoke 30, for instance. The structure realized thereby ensures the movable range of the read/write head 8a and, at the same time, the adverse effect of leakage magnetic flux can be reduced. It is to be noted here that the same size as the diameter of the outer circumferential surface of the yoke 30 includes a case where the difference between the diameter D2 of the second external cylinder part 10d and the diameter of the outer circumferential surface of the yoke 30 is within 1 mm.

If the center of the second external cylinder part 10d is displaced from the center of the first external cylinder 10b, a vibration in the radial direction will occur in the second external cylinder 10d when the hub 10 rotates. As the radial vibration becomes larger, the read/write head 8a may possibly come into contact with the second external cylinder part 10d. In the light of this, the second external part 10d may be configured to be processed continuously from a process of the first external cylinder part 10b in a manner such that the second external cylinder part 10d is concentric with the first external cylinder part 10b. For example, while the hub 10 is being rotated, the first external cylinder part 10b, the second external cylinder part 10d and an inner circumference directly supported by the bearing unit of the hub 10 are cut so that they can be continuously flat along the rotating shaft. As a result, the degree of the radial vibration occurring in the second external cylinder part 10d can lie within the range of a predetermined reference value when the hub 10 rotates. The condition of being concentric includes a case where the distance between the center of the second external cylinder part 10d and the center of the first external cylinder part 10b is within the range of 0.1 mm.

In the manufacturing process of the disk drive device 100, the disk drive device 100 may inadvertently hit a production equipment and the like. In such a case, an outer circumferential end of the seating surface 10c in the hub 10 may be deformed. If the outer circumferential end thereof is deformed, a problem will arise where the recording disks 200 are placed in a tilted manner.

In order to resolve this problem, the outer circumferential end of the seating surface 10c is so arranged as to be on a radially inward side of a conic surface circumscribing the outer shape of the hub 10. In FIG. 2, a circumscribed conic surface 500 circumscribes the outer shape of the hub 10, and the diameter of the circumscribed conic surface 500 decreases in a direction from a base member 50 side toward the hub 10. The outer circumferential end of the seating surface 10c lies inside the circumscribed conic surface 500 and is so arranged as not to come in direct contact with the circumscribed conic surface 500. With this arrangement, in case the disk drive device 100 hits the production equipment, the possibility that any part of the circumscribed conic surface 500 is hit and the outer circumferential end of the seating surface 10 is directly hit by the production equipment and the like can be reduced. That is, the possibility that the recording disks 200 are placed in a tilted manner can be reduced.

Where the disk drive device 100 is used, for example, as a hard disk recorder, for personal use, which records and reproduces the images, the disk drive device 100 rotates and drives the hub 10 at a first rotational frequency NL (Hz), which is relatively low speed, in order to suppress the power consumed thereby. This is advantageous in that the power consumed thereby is reduced.

On the hand, where the disk drive device 100 is used as one for business purposes, the disk drive device 100 rotates and drives the hub 10 at a second rotational frequency NH (Hz), which is relatively high speed. This is advantageous in that the operation, at the time the data is read and written, is high speed. There is a method for designing and manufacturing them separately. In such a method, a plurality of metallic molds and a plurality of production facilities are required and therefore the manufacturing cost will be high. Also, this method is not preferable in terms of natural resources saving. Thus, there is a demand for a scheme where a single desk drive device 100 is used at multiple speeds.

If a single disk drive device is used at the second rotational frequency NH which is higher than the first rotational frequency NL, a large vibration may occur due to the torque ripple and the resonance in a secondary rocking mode. In the present embodiment, if the eigenfrequency F0 is 2420 (Hz) and the rotational frequency NH is 110 (Hz) (6600 r/m), there is a possibility that the lower sideband component of the torque-ripple center frequency, namely ((3·P−1)·N), coincides with the upper-side split frequency of the resonance in a secondary rocking mode, namely (F0+N), and therefore a large vibration occurs.

To address this problem, the axial dimension of the extending part 10e of the hub is configured such that the eigenfrequency F0 satisfies a relation F0+N<(3·P−1)·N, equivalently F0<NH·(3·P−2) if the hub is rotated at NH (Hz) in addition to NL (Hz). For example, the axial dimension Le of the extending part 10e is configured such that the eigenfrequency F0 satisfies a relation NL·(3·P+2)<F0<NH·(3·P−2) if the hub is rotated at the first rotational frequency NH and the second rotational frequency NL. Thereby, the vibration can be reduced even though multiple rotational frequencies are used.

As an example, the diameter D2 of the second external part 10d is set such that the eigenfrequency F0 is the mid-value of NL·(3·P+2) and NH·(3·P−2). NL=90 (Hz), NH=110 (Hz) and P=8 are substituted into the above formulae, so that the mid-value of the eigenfrequency F0 is evaluated as 2380 (Hz) {=(2340+2420)/2}. To obtain the desired eigenfrequency F0 of 2380 (Hz), the radial dimension Le of the extending part 10e is determined through an experiment by modifying the diameter D3 of the circular wall 10f, the diameter D2 of the second external cylinder part 10d and the axial dimension Ld of the second external cylinder part 10d.

When, in the present embodiment, the diameter D3 of the circular wall 10f is 33.9 mm and the axial dimension Ld of the second external cylinder part 10d is 1.65 mm, F0 of 2380 (Hz) is obtained when the diameter of the second external cylinder part 10d is 31.9 mm. By employing this configuration, multiple rotational frequencies, which are 90 (Hz) and 110 (Hz), can be used in a single disk drive device.

In the above-described embodiment, a description has been given mainly of a hard disk drive but is not limited thereto. For example, the disk drive device 100 having a configuration as shown in FIG. 2 is produced, and the disk drive device 100 thus produced may be mounted on an optical disk recording/reproducing apparatus such as a CD (Compact Disc) apparatus and a DVD (Digital Versatile Disc) apparatus.

In the present embodiment, a description is given of a case where the circular wall 10 and the hub 10 are integrally provided. However, this should not be considered as limiting and, for example, a circular member (annular member) equivalent to the circular wall 10f may be formed separately and then may be fixedly secured to the external cylinder part 10d. A plastic material may be used to form a circular member corresponding to the circular wall 10f. According to this modification, the weight of the disk drive device 100 is reduced The present invention is not limited to the above-described embodiment and modifications only. It is understood by those skilled in the art that various further modifications such as changes in design may be added to the embodiment based on their knowledge and the embodiments added with such further modifications are also within the scope of the present invention.

What is claimed is:

1. A disk drive device comprising:
a base member;
a hub configured such that a double-sided recording disk is placed thereon;
a read/write head configured to read and write in each of sides of the double-sided recording disk;
a bearing unit configured to relatively rotatably support the hub against the base member;
a core, fixed to the base member, configured to contain a circular part and a plurality of salient poles radially extending from the circular part;
a three-phase coil formed in such a manner as to wind around the plurality of salient poles;
a yoke fixed to the hub; and
a magnet fixed onto an inner circumference of the yoke and radially facing the plurality of salient poles, the magnet being magnetized to drive P poles (P being an even number greater than or equal to 2) circumferentially, the hub including:
a first external cylinder part extending axially, the first external cylinder part being fit to a central hole of the double-sided recording disk;
a seating surface on which the double-sided recording disk is placed, the seating surface connecting to the first external cylinder part and extending in a radially outward direction;
a second external cylinder part connecting to the seating surface and extending axially; and
an extending part connecting to the second external cylinder part and extending in a radially outward direction,
wherein when a non-rotating eigenfrequency of resonance in a secondary rocking mode with the double-sided recording disk placed on the hub is defined to be F0(Hz) and a rotational frequency of the hub is defined to be N (Hz), the eigenfrequency F0 satisfies a relation F0>N·(3·P+2), and
wherein the base member includes a concave part surrounding at least a lower part of the second external cylinder part, and the extending part is located axially below an upper end of an inner circumferential end of the concave part.

2. The disk drive device according to claim 1, wherein the second external cylinder part is configured relative to the double-sided recording disk in such a manner as to ensure a radially movable range of the read/write head for reading and writing data from and to the double-sided recording disk.

3. The disk drive device according to claim 1, wherein the magnet is provided radially inward of a part of the seating surface in contact with the double-sided recording disk.

4. The disk drive device according to claim 1, wherein the second external cylinder part is positioned nearer an outer circumferential surface of the yoke than that of the magnet, in a radial direction.

5. The disk drive device according to claim 1, wherein the diameter of the second external cylinder part is substantially identical to that of an outer circumferential surface of the yoke.

6. The disk driver device according to claim 1, wherein the second external cylinder part is configured to be processed continuously from a process of the first external cylinder part in a manner such that the second external cylinder part is substantially concentric with the first external cylinder part.

7. The disk driver device according to claim 1, wherein an outer circumferential end of the seating surface is provided on a radially inward side of a conic surface circumscribing an outer shape of the hub.

8. The disk drive device according to claim 1, wherein when the disk drive device is used with a rotational frequency M (Hz) which is greater than the rotational frequency N, the eigenfrequency F0 satisfies a relation F0<M·(3·P−2) so as to constitute a radial dimension of the extending part.

9. The disk drive device according to claim 1, wherein said hub comprises a circular wall connecting to the extending part and extending axially,
wherein the yoke is fixed onto an inner circumferential surface of the circular wall.

10. A disk drive device comprising:
a base member;
a hub configured such that a double-sided recording disk is placed thereon;
a read/write head configured to read and write in each of sides of the double-sided recording disk;
a bearing unit configured to relatively rotatably support the hub against the base member;
a core, fixed to the base member, configured to contain a circular part and a plurality of salient poles radially extending from the circular part;
a three-phase coil formed in such a manner as to wind around the plurality of salient poles;
a yoke fixed to the hub; and
a magnet fixed onto an inner circumference of the yoke and radially facing the plurality of salient poles, the magnet being magnetized to drive P poles (P being an even number greater than or equal to 2) circumferentially,
the hub including:
a first external cylinder part extending axially, the first external cylinder part being fit to a central hole of the double-sided recording disk;
a seating surface on which the double-sided recording disk is placed, the seating surface connecting to the first external cylinder part and extending in a radially outward direction;
a second external cylinder part connecting to the seating surface and extending axially; and
an extending part connecting to the second external cylinder part and extending in a radially outward direction,
wherein an outer circumferential end of the seating surface is provided on a radially inward side of a conic surface circumscribing an outer shape of the hub, and
wherein the base member includes a concave part surrounding at least a lower part of the second external cylinder part, and the extending part is located axially below an upper end of an inner circumferential end of the concave part.

11. The disk drive device according to claim 10, wherein the extending part is formed such that a radial dimension of the extending part is smaller than an axial dimension of the second external cylinder part.

12. The disk drive device according to claim 10, wherein when a non-rotating eigenfrequency of resonance in a secondary rocking mode with the double-sided recording disk placed on the hub is defined to be F0(Hz) and a rotational frequency of the hub is defined to be N (Hz), the disk drive device is configured in a manner such that the eigenfrequency F0 satisfies a relation F0>N·(3·P+2).

13. The disk drive device according to claim 10, wherein the second external cylinder part is configured relative to the double-sided recording disk in such a manner as to ensure a radially movable range of the read/write head for reading and writing data from and to the double-sided recording disk.

14. The disk drive device according to claim 10, wherein the second external cylinder part is positioned nearer an outer circumferential surface of the yoke than that of the magnet, in a radial direction.

15. The disk drive device according to claim 10, wherein the diameter of the second external cylinder part is substantially identical to that of an outer circumferential surface of the yoke.

16. A disk drive device comprising:
a base member;
a hub configured such that a double-sided recording disk is placed thereon;
a read/write head configured to read and write in each of sides of the double-sided recording disk;
a bearing unit configured to relatively rotatably support the hub against the base member;
a core, fixed to the base member, configured to contain a circular part and a plurality of salient poles radially extending from the circular part;
a three-phase coil formed in such a manner as to wind around the plurality of salient poles;
a yoke fixed to the hub; and
a magnet fixed onto an inner circumference of the yoke and radially facing the plurality of salient poles, the magnet being magnetized to drive P poles (P being an even number greater than or equal to 2) circumferentially,
the hub including:
a first external cylinder part extending axially, the first external cylinder part being fit to a central hole of the double-sided recording disk;
a seating surface on which the double-sided recording disk is placed, the seating surface connecting to the first external cylinder part and extending in a radially outward direction;
a second external cylinder part connecting to the seating surface and extending axially; and
an extending part connecting to the second external cylinder part and extending in a radially outward direction,
wherein the base member includes a concave part surrounding at least a lower part of the second external cylinder part, and the extending part is located axially below an upper end of an inner circumferential end of the concave part.

17. The disk drive device according to claim 16, wherein the extending part is formed such that a radial dimension of the extending part is smaller than an axial dimension of the second external cylinder part.

18. The disk drive device according to claim 16, wherein when a non-rotating eigenfrequency of resonance in a secondary rocking mode with the double-sided recording disk placed on the hub is defined to be F0(Hz) and a rotational frequency of the hub is defined to be N (Hz), the disk drive device is configured in a manner such that the eigenfrequency F0 satisfies a relation F0>N·(3·P+2).

19. The disk drive device according to claim 16, wherein the second external cylinder part is configured relative to the double-sided recording disk in such a manner as to ensure a radially movable range of the read/write head for reading and writing data from and to the double-sided recording disk.

20. The disk drive device according to claim 16, wherein the second external cylinder part is positioned nearer an outer circumferential surface of the yoke than that of the magnet, in a radial direction.

* * * * *